Dec. 18, 1956 K. L. LANNINGER 2,774,617
ANGULARLY TILTABLE, RAPIDLY ADJUSTABLE TUBE COUPLING
Filed Nov. 2, 1954

United States Patent Office 2,774,617
Patented Dec. 18, 1956

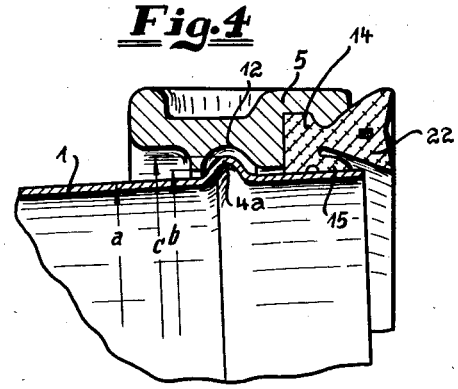
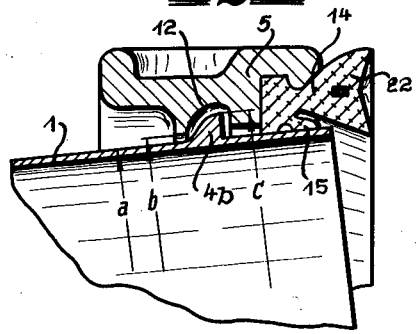
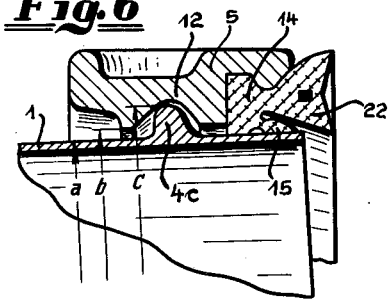
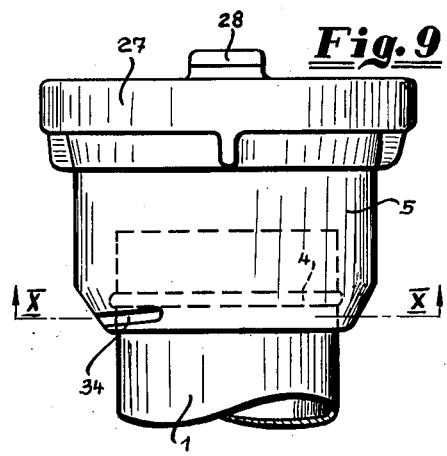
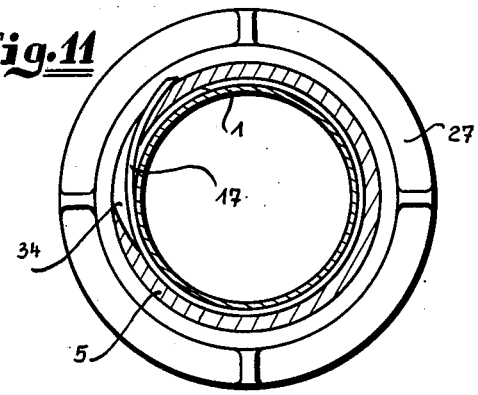
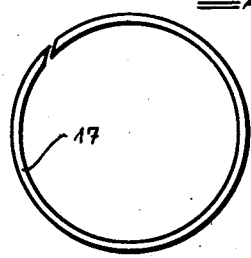

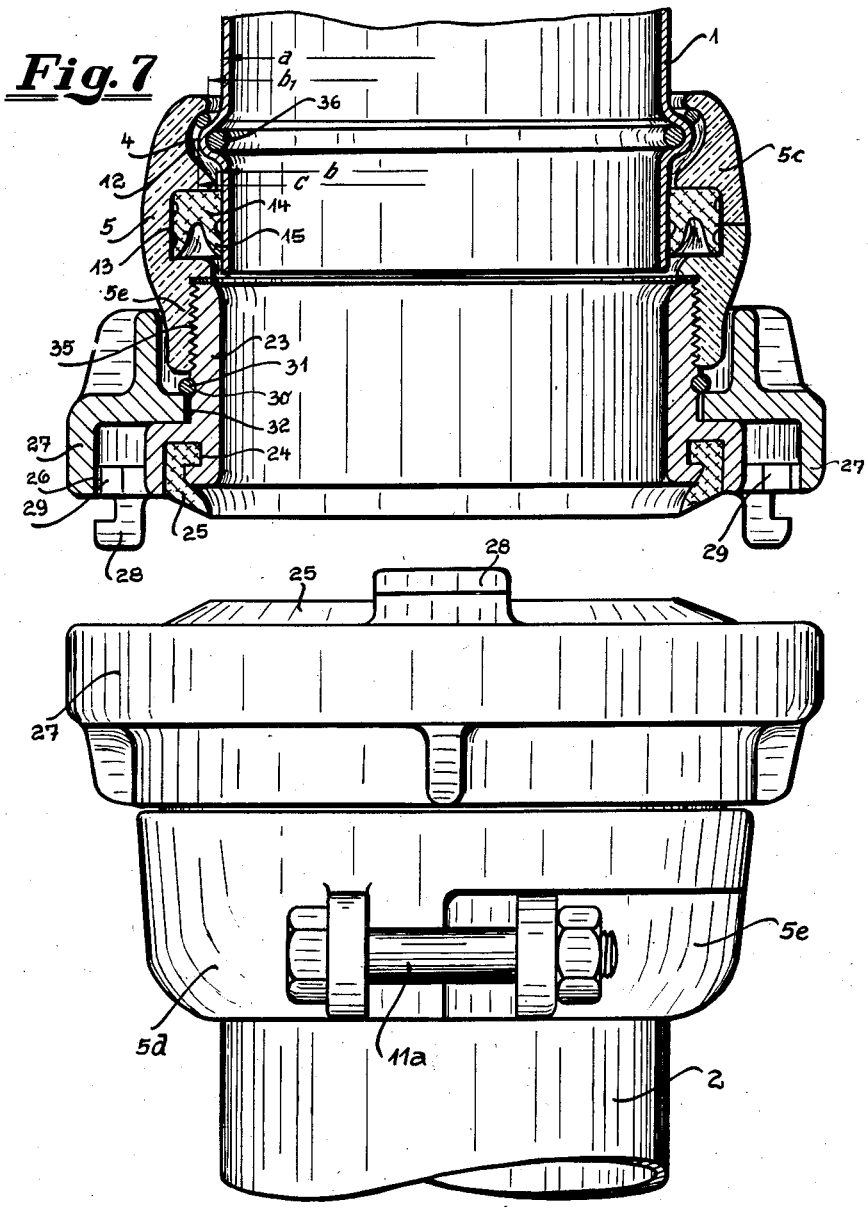

2,774,617

ANGULARLY TILTABLE, RAPIDLY ADJUSTABLE TUBE COUPLING

Karl Ludwig Lanninger, Frankfurt am Main, Germany

Application November 2, 1954, Serial No. 466,255

Claims priority, application Germany November 16, 1953

5 Claims. (Cl. 285—71)

This invention relates to couplings for tubes, which are offset angularly and snap into place rapidly, and specifically deals with the problem of constructing such couplings in order to make them easily removable from the tube ends to which they are attached and/or easily adjustable thereon, so that the tubes and the couplings may be packed separately when being shipped from the manufacturer to its users, whereby the required shipping space is considerably reduced.

The invention, furthermore, deals with the problem of employing the angularly tiltable tube couplings for the known connections with bayonet fastening links, as are, for example, used for firemen's hoses.

While confronting these problems, the invention relates to angularly tiltable, rapidly adjustable tube couplings combining the following characteristics: Two identical coupling halves, one respectively on each tube end, with the inside diameter of the said coupling halves larger than the outside diameter of the tubes, an arched annular recess in the inner wall of each coupling half and a ring-shaped ridge on each tube end interlocking with the aforesaid recess, thus capable of preventing the parting of the coupling halves from the tube ends, a sealing sleeve between each coupling half and the corresponding tube end to which this coupling half is attached, the said sealing sleeves being located with regard to the tube ends, in front of the annular recesses, and finally, frontal seals, to be set into the coupling halves, as well as locking devices and counterparts thereof for the former, suited to join the two coupling halves tightly in the closed position, by pressing the two frontal seals against each other.

Between the ring-shaped ridge on each tube end and the arched annular recess of each respective coupling half a ring is provided behind the ridges, serving as guide for each coupling half, over which the coupling halves with the annular recesses may roll.

Additional features of the new coupling are hereinafter described more particularly with the aid of the examples of construction types as illustrated in the accompanying drawings.

Figs. 4–6 are detailed partial sectional views of modified couplings showing the annular recesses and the ring-shaped ridges on the tube ends cooperating with these recesses;

Fig. 7 illustrates a further modification of the coupling, in the open position, while one coupling half is shown as a side elevation and the other in cross section;

Fig. 9 is a further modification of a coupling half, shown in elevation;

Fig. 11 is a transverse sectional view taken on the line XI—XI of Fig. 10, and

Fig. 12 shows the abutment ring.

Figure 1:
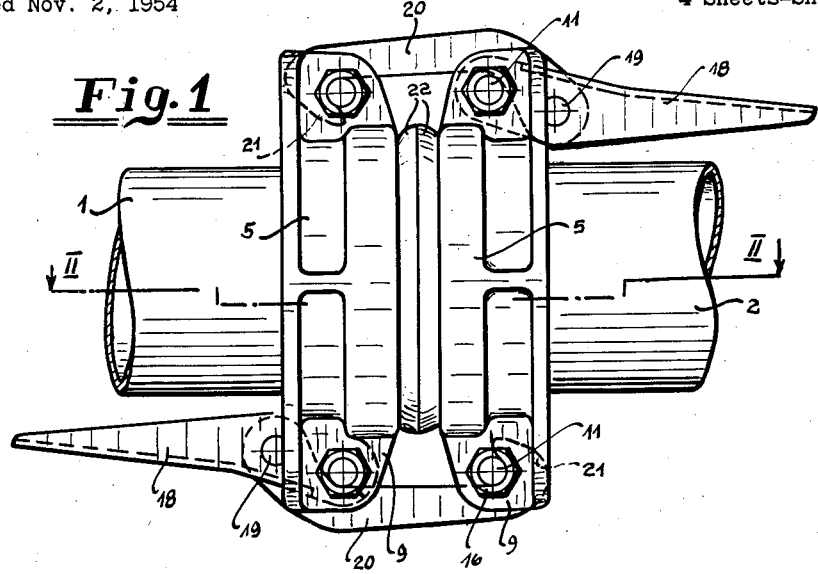
Fig. 1 is an elevational view of the tube coupling of the present invention, in the closed position.
Figure 2:
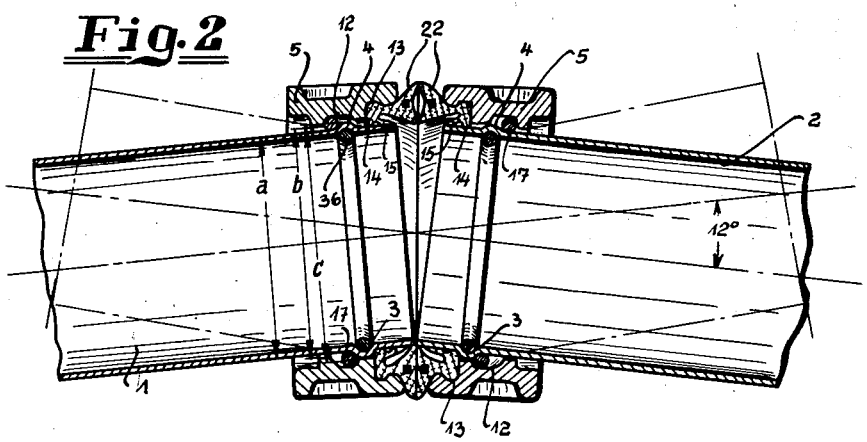
Fig. 2 is a cross sectional view taken on the line II—II of Fig. 1.
Figure 3:
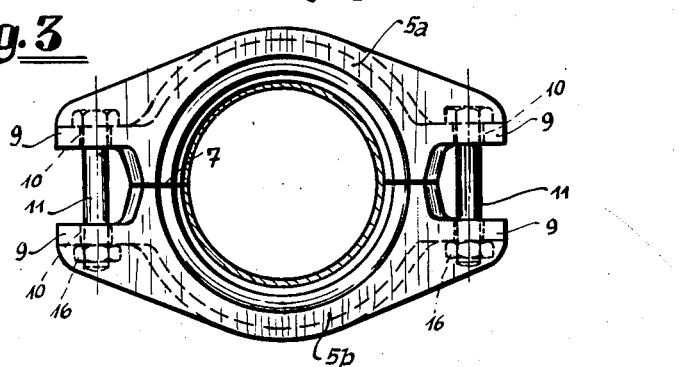
Fig. 3 shows an end view of a coupling half.

In the modification of the tube coupling illustrated in Figs. 1–3, each of the tube ends 1 and 2, which are to be connected, is provided, close to the end of the tube, with a ring-shaped groove 3, which has been shaped from the inside and produces on the outer surface of the tubes an annular bead or protuberance 4. The annular protuberances may have a cross section curved in the form of a circular arc, as is shown in Fig. 2, or they may be also shaped as a rounded angle 4a, according to Fig. 4, with one side of the angle ascending at a steeper gradient than the other side. The protuberances 4 are appropriately provided with the spring rings 36, which thus reinforce the annular protuberances 4.

Figs. 5 and 6 indicate two different forms of the construction, wherein the annular protuberances 4b and 4c, respectively, are welded onto the tube ends 1.

According to Figs. 1–6, each coupling half consists of an annular body 5, having an inside diameter $b$ which is greater than the outside diameter $a$ of the tubes, but smaller than the outside diameter $c$ of the annular protuberances 4.

The annular bodies 5 are divided along a plane passing through the diameters thereof, and parallelly with the dividing slit 7 they are provided with the laterally projecting bosses 9, the latter having the openings 10 for accommodation of the nutted bolts 11. The inside walls of the annular bodies 5 are provided with annular recesses 12 which, when these bodies 5 are slid in place on the tube ends 1 and 2, will come into play with the annular protuberances 4 of the tube ends and overlap them.

On their front faces the annular bodies 5 are provided with the inset hollows 13, to accommodate the lip seals 14, with the inner lips 15 thereof capable of being drawn up to the tube ends 1 and 2, so as to seal them tightly. The parts are assembled in that the lip seals 14 are slid in place on the tube ends 1 and 2, and thereafter parts 5a and 5b of the annular bodies are mounted in such a fashion that the lip seals 14 will come to be placed in the inner hollows 13 and the ring-shaped recess 12 will overlap the annular protuberance 4. Parts 5a and 5b are then fastened to each other by means of bolts 11 at the dividing slit 7, the bolts being secured with the aid of nuts 16 having tight washers.

Thus the annular bodies 5 are secured on the tube ends 1 and 2, in such a manner that they may gyrate thereon, while the lip seals 15 procure the sealing off of the connections and make possible a swinging motion of the annular bodies 5 as against the tube ends 1 and 2.

A parting of the annular bodies 5 from the tube ends 1 and 2 is prevented through the interlocking of the annular protuberance 4 with recess 12 of the annular bodies 5 (cf. Figs. 4–6).

Preferably, a friction ring 17 may be further provided (cf. Fig. 2) between the tube ends 1 and 2, behind the ring-shaped protuberances 4 (Fig. 2), and the annular bodies 5 in the region of the recesses 12, having the form of a cut-open spring ring (cf. Fig. 12) and being mounted and secured on the tube end through the resilience of the spring. The use of the spring ring 17 facilitates the angular tilting of the annular bodies 5 in relation to the tube ends, inasmuch as the recess 12 will roll over onto ring 17.

As can be seen in Fig. 3, the bosses 9 of parts 5a and 5b are set back in relation to the dividing slit 7, so that the nutted bolts 11, which are accommodated therein, come to be exposed for part of their lengths, between the bosses 9 being positioned opposite each other.

One of the bolts 11 of each coupling half 5 is provided with a hinging clamp lever 18 having a locking catch 20 swinging around a pivot 19. The two parts 18 and 20 constitute a toggle joint lock which may be tightened through the engagement of the catch lug 21 of the locking catch on the opposite bolt 11 of the other coupling half, so as to establish a connection between the two coupling halves.

The lip seals 14 are provided with the projections 22, which protrude beyond the fronts of the annular bodies 5 that are to be coupled to each other, thus serving as seals of the frontal areas and producing a tight seal of the coupling halves 5, when in their closed position.

In the type of construction according to Fig. 7 the tube ends 1 and 2 are provided with annular protuberances 4, and the ring-shaped bodies 5, having the inside diameter $b$, which is larger than the outside diameter $a$ of the tube ends, feature the recesses 12, which face toward the inside of these bodies 5 and overlap by play the aforesaid protuberances 4, while the inside diameter $b_1$ at the end of the annular coupling halves 5 is smaller than the outside diameter $c$ of the ring-shaped protuberances 4.

The annular bodies 5, furthermore, are provided with the hollows 13, to accommodate the lip seals 14. However, the coupling halves are not completely divided along a plane passing through the diameters thereof, but solely in the regions of the inwardly turned recesses 12. The thereby separated portion 5c of the coupling half is secured to the remaining part 5d of the ring-shaped body with the aid of bolt 11a, and may be removed therefrom.

Thus, the annular body 5d may be slipped on the tube end with the lip seat set in its proper place, and it will be securely fastened on this tube end, being safe against parting therefrom after portion 5c has been screwed on. A friction ring 17 may be provided in this type of construction, in a manner similar to the one as described hereinbefore.

Coupling half 5d is furnished with a projecting attachment, which protrudes over the tube end and, on the inside, is provided with threads 35 to accommodate a screw collar 23. Into a recess 24 of the frontal area of this screw collar 23 is set an end seal 25, and through a shoulder piece 26 the collar supports a ring 27, which, in a manner that in itself is known, is furnished with two bayonet-type couplings 28 and with the contact shoulders 29 to engage the bayonet couplings of the opposite ring.

For easier handling of ring 27, when setting it over the screw collar 23, the former may be further provided with a channel 30, for accommodation of a spring ring 31, which braces a shoulder 32 of ring 27.

Figure 8:
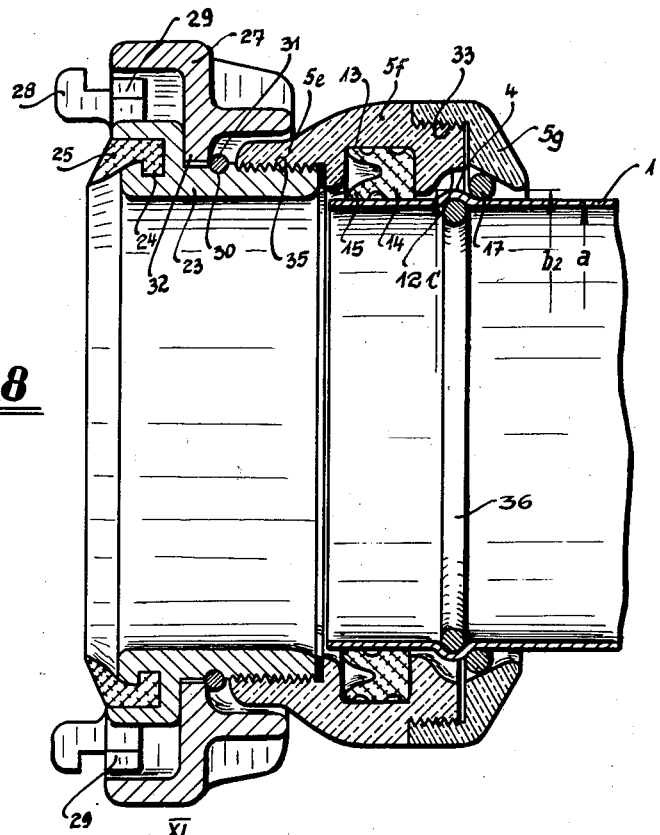
Fig. 8 shows still another modification of the coupling, only one coupling half being drawn in cross section.

The annular body 5, however, may be also divided in a direction, which is perpendicular to the center line thereof. (Cf. Fig. 8.) Here, while the construction is otherwise in accordance with Fig. 7, the ring-shaped body 5 is divided crosswise in the region of recess 12, while the main body of the coupling half 5f is provided with threads 33, facing outwards, for accommodation of an end ring 5g. In this case the inside diameter $b_2$ of end ring 5g is larger than the outside diameter $c$ of the annular protuberance 4 on the tube end, so that the end ring 5g may be slipped over the annular protuberance, and a friction ring 17 must be provided, to prevent the parting of the annular bodies 5 from the tube ends 1 and 2.

Figure 10:
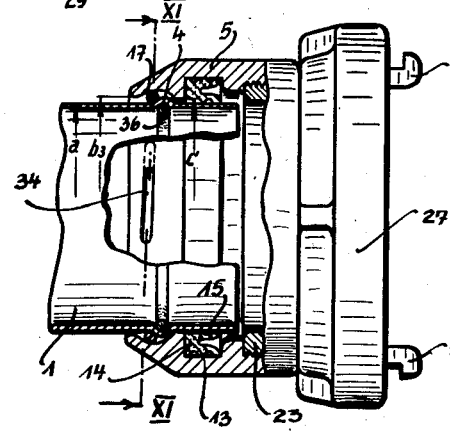
Fig. 10 is a partial sectional view taken on the line X—X of Fig. 9.

Nevertheless, an undivided coupling half 5 may be also used, having a diameter $b_3$ (Fig. 10), at the rear end of the coupling half, which is larger than the outside diameter $c$ of the annular protuberance 4, provided that it had been arranged in a manner that will prevent the parting of the thus constructed annular body 5 from the respective tube end. In accordance with Figs. 9–11, this requirement is complied with in that the undivided annular body 5 is provided, in the region of recess 12, with a channel, which leads from the outside to the inside and serves to insert the spring ring 17.

The new coupling may be employed for a great variety of coupling links. It may be fitted by anybody on the already prepared tube ends as a supplementary addition thereto, and it makes possible that simple coupling links can be used for tubing.

I claim:

1. A rapidly connectible coupling for angularly tiltable pipes, comprising, in combination, two identical coupling sleeves, one on each pipe end to be connected, with the inside diameter of the coupling sleeves being greater than the outside diameter of the pipes; an arched annular recess in the inside wall of each coupling sleeve and a ring-shaped protuberance on each pipe end interlocking with the aforesaid recesses to prevent parting of the coupling sleeves from the associated pipe ends, a sealing gasket between each coupling half and the corresponding pipe end with which such coupling sleeve is associated, the said sealing gaskets being located, with respect to the pipe ends, in front of the annular recesses and extending beyond the said coupling sleeves and the pipe ends to define abutting frontal seals, and a pair of diametrically opposed locking devices for joining the two coupling sleeves and pressing the aforesaid frontal seals against each other.

2. A coupling according to claim 1, including a spring ring inserted between the ring-shaped protuberance on each tube end and the arched annular recess of each coupling for guiding the coupling sleeves, so that the coupling sleeves may roll around their annular recesses.

3. A coupling in accordance with claim 1, wherein the coupling sleeves, in the direction of the center lines thereof, are divided into two half shells, and further comprising anchoring means for the locking devices retaining the two half shells of each coupling sleeve on the associated pipe.

4. A coupling in accordance with claim 1, wherein the protuberances on the pipe ends comprise corrugated portions of the pipe walls, and that such protuberances are internally reinforced by spring rings inserted therein.

5. A coupling according to claim 1, wherein the coupling sleeves are divided longitudinally into two half shells having cooperating lugs thereon and bolts extending through said lugs, one bolt of each coupling sleeve being provided with a clamp lever, and the other bolt of the other respective coupling sleeve constituting the locking device in association with such clamp lever.

References Cited in the file of this patent

UNITED STATES PATENTS

| 310,264 | Emery | Jan. 6, 1885 |
| 412,609 | Hammond et al. | Oct. 8, 1889 |
| 1,843,394 | Lange | Feb. 2, 1932 |
| 1,899,343 | Mackey | Feb. 28, 1933 |
| 1,994,527 | Merrill | Mar. 19, 1935 |
| 2,396,078 | Box | Mar. 5, 1946 |

FOREIGN PATENTS

| 613,786 | Great Britain | Dec. 2, 1948 |